US012733564B2

(12) United States Patent
Kirk et al.

(10) Patent No.: US 12,733,564 B2
(45) Date of Patent: Sep. 15, 2026

(54) INTERROGATIVE INFERENCE SYSTEM AND METHODS FOR ADJUSTING GUIDANCE FOR GENERATIVE DECISION SUPPORT TOOLS BASED UPON INFERRING INTERROGATIVE INTENT

(71) Applicant: Deere & Company, Moline, IL (US)

(72) Inventors: Ryan Kirk, Urbandale, IA (US); Dylan J. Roth, Kyle, TX (US); Noel W. Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 65 days.

(21) Appl. No.: 18/882,416

(22) Filed: Sep. 11, 2024

(65) Prior Publication Data

US 2025/0133981 A1 May 1, 2025

Related U.S. Application Data

(60) Provisional application No. 63/594,566, filed on Oct. 31, 2023.

(51) Int. Cl.

| | |
|---|---|
| ***A01B 79/02*** | (2006.01) |
| ***A01B 79/00*** | (2006.01) |
| ***G06F 40/20*** | (2020.01) |

(52) U.S. Cl.
CPC ............ *A01B 79/02* (2013.01); *A01B 79/005* (2013.01); *G06F 40/20* (2020.01)

(58) Field of Classification Search
CPC ........ A01B 79/02; A01B 79/005; G06F 40/20
See application file for complete search history.

(56) References Cited

U.S. PATENT DOCUMENTS

| | | | |
|---|---|---|---|
| 7,167,797 | B2 | 1/2007 | Faivre et al. |
| 10,426,087 | B2 | 10/2019 | Bruns et al. |
| 11,240,962 | B2 | 2/2022 | Kriebel et al. |
| 2006/0200334 | A1 | 9/2006 | Faivre et al. |
| 2007/0239337 | A1 | 10/2007 | Anderson |
| 2009/0234695 | A1 | 9/2009 | Kapadi et al. |
| 2024/0142980 | A1 | 5/2024 | Baltz et al. |

OTHER PUBLICATIONS

Temsamani, Abdellatif Bey, et al. "A multimodal AI approach for intuitively instructable autonomous systems: A case study of an autonomous off-highway vehicle." Proceedings of the Eighteenth International Conference on Autonomic and Autonomous Systems, ICAS. 2022. (Year: 2022).*

* cited by examiner

*Primary Examiner* — Alan D Hutchinson
(74) *Attorney, Agent, or Firm* — Christopher J. Volkmann; KELLY, HOLT & CHRISTENSON PLLC

(57) ABSTRACT

A computer implemented method comprises obtaining a query, obtaining querying source context data, and processing the query to identify an interrogative type corresponding to the query based on language in the query. The method further comprises generating, based on the identified interrogative type, a prompt, the prompt identifying a task for an analytics engine, providing the prompt to the analytics engine, executing, with one or more models, analytics on one or more items of the querying source context data, based on the prompt. The method also includes determining one or more features of an output to be generated based on the identified interrogative type, the output responsive to the query, generating the output based on the executed analytics and the determined one or more features, and controlling a user associated system based on the output.

20 Claims, 9 Drawing Sheets

INTERROGATIVE INFERENCE SYSTEM AND METHODS FOR ADJUSTING GUIDANCE FOR GENERATIVE DECISION SUPPORT TOOLS BASED UPON INFERRING INTERROGATIVE INTENT

CROSS-REFERENCE TO RELATED APPLICATION

The present application is based on and claims the benefit of U.S. provisional patent application Ser. No. 63/594,566, filed Oct. 31, 2023, the content of which is hereby incorporated by reference in its entirety.

FIELD OF THE DESCRIPTION

The present description relates to generative artificial intelligence (AI) models. More specifically, the present description relates generative AI models as support tools for off-road operations.

BACKGROUND

There are many types of AI models that perform a wide variety of different types of tasks. The type of AI model is often defined by the function that the model performs. For instance, natural language processing AI models related to natural language processing.

One specific type of AI model is referred to as a large language model (LLM). An LLM is a language model that includes a large number of parameters (often in the tens of billions or hundreds of billions). An LLM is often referred to as a generative AI model in that it receives, as an input, a prompt which may include data, and an instruction to generate a particular output.

The discussion above is merely provided for general background information and is not intended to be used as an aid in determining the scope of the claimed subject matter.

SUMMARY

A computer implemented method comprises obtaining a query, obtaining querying source context data, and processing the query to identify an interrogative type corresponding to the query based on language in the query. The method further comprises generating, based on the identified interrogative type, a prompt, the prompt identifying a task for an analytics engine, providing the prompt to the analytics engine, executing, with one or more models, analytics on one or more items of the querying source context data, based on the prompt. The method also includes determining one or more features of an output to be generated based on the identified interrogative type, the output responsive to the query, generating the output based on the executed analytics and the determined one or more features, and controlling a user associated system based on the output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
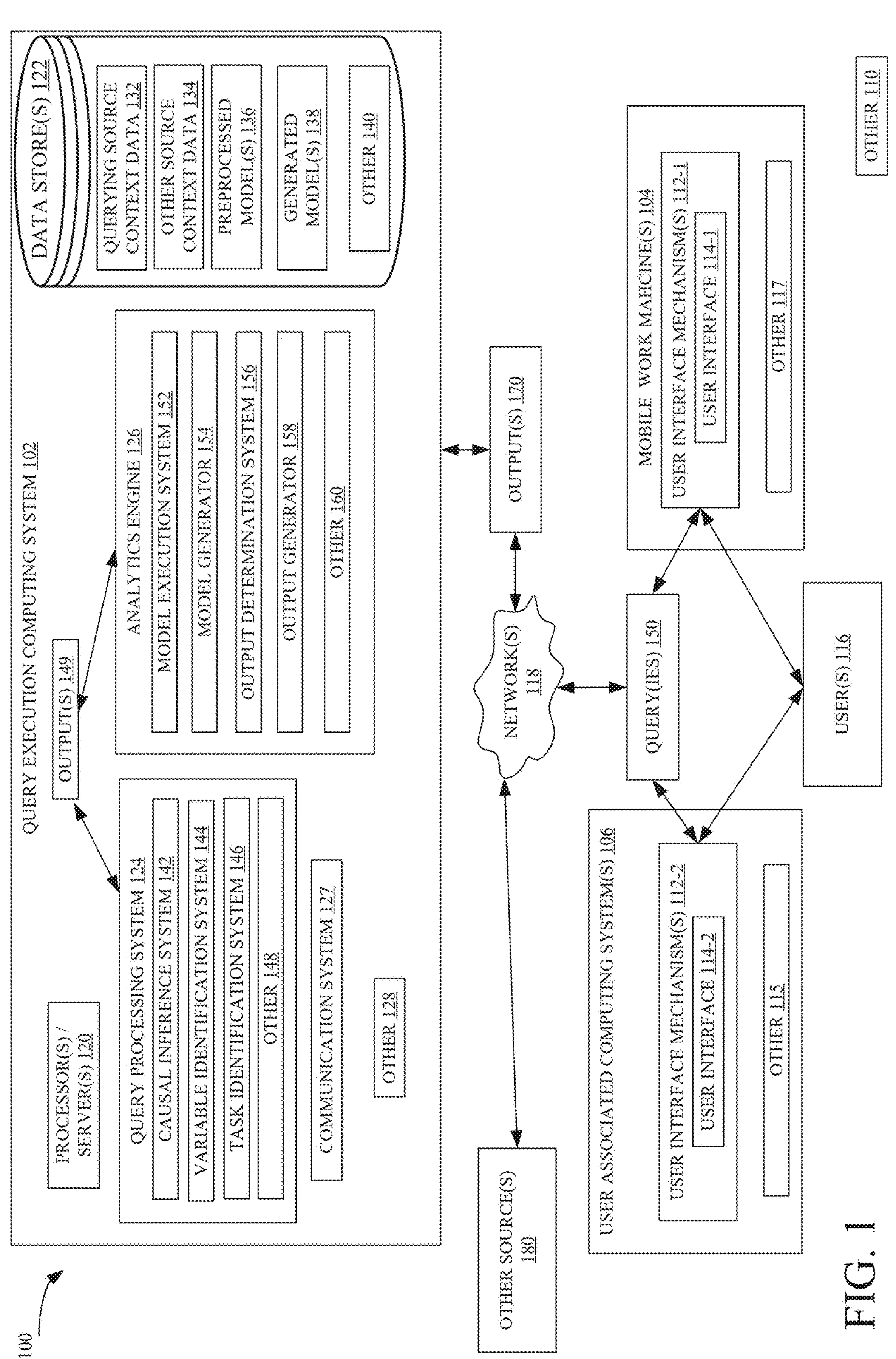
FIG. 1 is a block diagram of one example agricultural computing system architecture.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

A number of decisions must be made throughout the course of an operation, or multiple operations, or across a job or season (e.g. an agricultural season). Often, decisions must be made quickly and without time or resources for significant consideration. Such decisions can include whether to perform operations, the timing of operations, how to deploy resources to execute operations, and how to set machine settings for controlling a machine during an operation. Often, these decisions in order to maximize performance (e.g., yield, profit, time to complete, etc.).

Generative AI can be a useful tool to support the decision-making process in managing operation(s). However, current generative AI systems may not infer interrogative intent of a query and thus, may not provide sufficient insight in response to the query. Furthermore, current generative AI systems may not have or lead to a physical effect on a machine, such as mobile work machine (e.g., a mobile agricultural work machine, etc.).

The present discussion proceeds, in some examples, with respect to systems and methods that obtain a query from querying source, infer an interrogative intent of the query by identifying an interrogative type based on the query and further identify one or more variables and one or more tasks based on the query. The systems and methods further obtain data including querying source context data, other querying source context data, models, and other data. Based upon the interrogative type, the one or more variables, the task, and the obtained data, the systems and methods prompt an analytics engine to execute analytics and generate an output responsive to the query. The systems and methods determine an output to be generated based upon the interrogative type of the query and, in some examples, other factors, such as the timing of the query relative to one or more operations or a job or a season. The output may include a display or other indication, such as an audible indication, or both, as well operation parameters or prescriptions, or both. The output can be used, in some examples, to control one or more mobile work machines.

It will be understood that while various examples detailed herein proceed in the context of agricultural operations and agricultural work machines the systems and methods described herein are applicable to and can be used in various other types of off-road operations and off-road work machines, such as, but not limited to, construction operations and construction work machines, earth moving operations and earth moving machines, turf management operations and turf management machines, and forestry operations and forestry machines.

FIG. 1 is a block diagram of one example of an operations computing system architecture 100 (e.g., an agricultural operations computing system architecture, etc.) including a query execution computing system 102, and one or more user associated systems including one or more mobile work machines 104 (also referred to herein as work machines 104) and one or more user associated computing systems 106 (also referred to herein as computing systems 106). Operations computing system architecture 100 can include various other items 110 as well. It can be seen that work machines 104 and computing systems 106 can include, among other things, user interface mechanisms 112. User interface mechanisms 112 can generate user interfaces 114 for interaction by one or more users 116. A user 116 can interact with a user interface 114 in order to control and manipulate query execution computing system 102, a work machine 104, or a computing system 106. In some examples, work machines 104 or computing systems 106 can interact with query execution computing system 102 without the need for a user 116 to initiate the interaction. Thus, it will be understood that a user 116, a work machine 104, and a computing system 300 can each be a querying source that generates queries 150 to query execution computing system 102.

As illustrated, the items of operations computing system architecture 100 can be connected to one another directly over one or more networks 118. Networks 118 can include a wide area network (WAN), a local area network (LAN), a Wi-Fi network, a near field communication network, a cellular communication network, a controller area network (CAN), or an of a wide variety of other networks or combinations of networks. Before providing a more detailed description of the operation of operations computing system architecture 100, a description of some of the items in operations computing system architecture 100, and their operation, will first be provided.

Query execution computing system 102 includes one or more processors or servers 120, one or more data stores 122, query processing system 124, analytics engine 126, communication system 127, and one or more other items 128.

It will be understood that the one or more processors or servers 120 can include various processing units, including central processing units (CPUs) and graphic processing units (GPUs).

Communication system 127 provides for communication between items of query execution system 102 as well as between query execution system 102 and other items of operations computing system architecture 100. Communication system 127 can include wired communication circuitry or wireless communication circuity, or both, as well as wired communication components or wireless communication components, or both. In some examples, communication system 127 can be a cellular communication system, a system for communication over a wide area network (WAN), a system for communication over a local area network (LAN), a system for communication over a controller area network (CAN), such as a CAN BUS, a system for communication over a near field communication network, or a system for communication over any of a wide variety of other networks, or a system for communication over a combination of the previously described networks. Communication system 127 can include a system that facilitates downloads or transfers of information to and from a secure digital (SD) card or a universal serial bus (USB) card, or both.

Data stores 122, themselves, include querying source context data 132, other querying source context data 134, one or more preprocessed models 136, one or more generated models 138, and various other data 140.

Querying source context data 132 includes context data specific to the querying sources (e.g., work machines 104, computing systems 300, and user 116). Querying source context data 132 can include data that describes details about the querying source, such as the geographic location (or region) of the worksite (e.g., farm (or fields thereof), etc.) of (or corresponding to) the querying source, the size and number of worksites (e.g., size and number of fields of the farm, etc.) of (or corresponding to) the querying source, the timing in a current operation (or operations), job, or season of (or corresponding to) the querying source (i.e., where is the querying source at in the current operation (or operations), job, or season, for instance, pre-planting, post-planting, pre-harvest, post-harvest, etc.), the number, types/models, and ratings (e.g., capabilities, etc.) of work machines of (or corresponding to) the querying source, querying source current and historical worksite (e.g., agronomic, etc.) data, as well as various other data. Querying source current worksite (e.g., agronomic, etc.) data can include data relative to operation(s) already performed in a current operation (or operations), job, or season (e.g., agricultural operations such as tilling, planting, product application (e.g., spraying, spreading, etc.), harvesting, etc. as well as various other off-road operations such as construction operations, earth moving operations, turf management operations, forestry operations, etc.), which can include the timing and locations of the operation(s), the machine settings during the operation(s), sensor data generated during the operation(s), performance metrics (e.g., yield, time to complete, fuel consumption, production (e.g., tons per hour), cost/profit, etc.) relative to the performed operation(s), type and characteristics of material applied (e.g., type and characteristics of seed planted (e.g., species, hybrid, drought-resistant, pest-resistant, etc.), type and characteristics of other materials (e.g., fertilizer, pesticide, irrigation, etc.), as well as type and characteristics of other materials), material application rate, material application location, depth of material (e.g., seed planting depth, fertilizer depth, etc.), as well as various other data. Querying source current worksite (e.g., agronomic, etc.) data can include data relative to operations to be performed (e.g., planned operations) in current operation (or operations), job, or season, which can including the planned timing of the operations, the planned locations of the operations, the planned machine settings for the planned operations, the planned machine distribution/assignments for the planned operations, the planned type and characteristics of material to be applied, the planned locations of material to be applied, the planned application rate of material to applied, the planned depth of material to be applied, as well as various other data. Querying source current worksite (e.g., agronomic, etc.) data can include weather data, including weather experienced during a current operation (or operations), job, or season and weather forecast for a current operation (or operations), job, or season. Querying source current worksite (e.g., agronomic, etc.) data can include worksite (e.g., field, etc.) data, such as topography data for one or more worksites, soil characteristic data for one or more worksites, which can include soil type, soil moisture, soil temperature, soil compaction, etc., as well as various other worksite data. Querying source current worksite (e.g., agronomic, etc.) data can include various other data. Querying source historical worksite (e.g., agronomic, etc.) data can include data relative to operations performed in one or more previous operations, jobs, or seasons (i.e., historical operations), which can include the types of historical operations (e.g., agricultural operations such as tilling, planting, product application, harvesting, etc. as well as various other off-road operations such as construction operations, earth moving operations, turf management operations, forestry operations, etc.), the timing of the historical operations, the locations of the historical operations, the machines settings for the historical operations, sensor data generated during the historical operations, performance metrics relative to the performed operations, the machine distribution/assignments for the historical operations, the type and characteristics of material historically applied, the locations of material historically applied, the historical application rate of material, the historical depth of material, as well as various other data. Querying source historical worksite (e.g., agronomic, etc.) data can include worksite (e.g., field, etc.) data, such as historical topography for one or more worksites, historical soil characteristic data for one or more worksite, which can include historical soil type, historical soil moisture, historical soil temperature, historical soil compaction, etc., as well as various other historical worksite data. Querying source historical worksite (e.g., agronomic, etc.) data can include historical weather data. Querying source historical worksite (e.g., agronomic, etc.) data can include various other historical data.

Other source context data 134 is similar to querying context data 132 except the other source context data 134 corresponds to other querying sources (e.g., other users, systems associated with other users, such as work machines and computing systems associated with other users) of query execution computing system 102. These other querying sources may be other users (e.g., farmers, construction, earth moving, turf management, and forestry managers, etc.) that work (e.g., farm, etc.) in various areas. Some of the other querying sources 180 may be similar to the querying sources (e.g., user 116, work machines 104, computing systems 300) that is, some of the other querying sources 180 may operate in a similar geographic area, in a similar climate, operate similar machinery, perform similar operations (e.g., grow similar crops, etc.) or may have various other similarities. Some of the other querying sources 180 may be different than the querying sources (e.g., user 116, work machines 104, computing systems 300), that is, some of the other querying sources 180 may operate in a different geographic area, in a different climate, operate different machinery, perform different operations (e.g., grow different crops, etc.), or may have various other differences.

Preprocessed models 136 are models generated prior to a given query or are models generated by a third-party and obtained by query execution computing system 102, or both. For example, preprocessed models 136 may be models generated based upon expert knowledge or machine learning that is provided or conducted prior to the a given query. Preprocessed models 136 are configured to receive one or more inputs and generate one or more outputs. Preprocessed models 136 can include various equations or functions (e.g., linear regression, etc.), AI models (e.g., neural networks, such as a directed acyclic graph, as well as various other types of AI models, etc.), other types of machine learning models, as well as various other types of models.

Generated models 138 are models generated in response to a given query. Generated models 138 are configured to receive one or more inputs and generate one or more outputs. Generated models 138 can include various equations or functions (e.g., linear regression, etc.), AI models (e.g., neural networks, etc.), other types of machine learning models, as well as various other types of models.

It will be understood that the querying source context data 132 may be provided by a querying source, such as in a query 150 itself or through other inputs. Querying source context data 132 can be obtained (e.g., received or retrieved) from work machines 104 (e.g., from sensors on work machines 104, from data stores on work machines 104, etc.), or from computing systems 300 (e.g., from data stores on computing systems 300, etc.). Querying source context data 132 may be provided obtained from other types of machines (e.g., satellites, etc.) or components of other types of machines (e.g., sensors or data stores of other types of machines, etc.). Querying source context data 132 may be obtained from third parties, such as the manufacturer, service providers, vendors, dealerships, technicians etc. Querying source context data 132 can be obtained from other sources as well. For instance, the querying source may be an employee or a user associated system of an entity (e.g., farm, company, etc.) and one or more items of querying agricultural source context data 132 may be provided by another source, such as the owner or manager of the entity (e.g., farm, company, etc.). Querying source context data 132 can additionally, or alternatively, be provided or obtained in various other ways or from various other sources, or both.

Similarly, other source context data 134 may be provided by an other source 180, such as through inputs from the other user, including one or more queries made by the other user to query execution computing system 102, from other work machines associated with another user (e.g., from sensors on the other work machines, from data stores on the other work machines, etc.). Other source context data 134 can be obtained from other types of machines (e.g., satellites, etc.) or components of other types of machines (e.g., sensors or data stores of other types of machines, etc.). Other source context data 134 may be obtained from third parties, such as the manufacturer, service providers, vendors, dealerships, technicians, etc. Other source context data 134 can be obtained from other users as well (i.e., an other user other than the other source to which the particular other source context data 134 pertains). Other source context data 134 can additionally, or alternatively, be provided or obtained in various other ways or from various other sources, or both.

Data stores 122 can include various other data 140 including, but not limited to, one or more queries 150, one or more outputs 149, one or more outputs 170, computer executable instructions that are executable by one or more processors or servers 120 to implement other items or functionalities of query execution computing system 102, as well as various other data. It will be understood that data stores 122 can include different forms of data stores, for instance one or more of volatile data stores (e.g., Random Access Memory (RAM)) and non-volatile data stores (e.g., Read Only Memory (ROM), hard drives, solid state drives, etc.).

Query processing system 124 receives one or more queries 150 generated by a querying source (e.g., user 116, mobile work machines 104, computing system 300) and processes the one or more queries 150, individually, or in sets. Query processing system 124 includes interrogative inference system 142, variable identification system 144, task identification system 146, and can include other items 148 as well. Interrogative inference system 142, variable identification system 144, and task identification system 146 can each be generative AI models such as an LLM or can be other types of models. Additionally, while interrogative inference system 142, variable identification system 144, and task identification system 146 are shown as separate, in another example, the functionalities of interrogative inference system 142, variable identification system 144, and task identification system 146 can be performed by a single system, for instance, a single model, such as a single generative AI model (e.g., an LLM) or another type of model. Interrogative inference system 142 identifies an interrogative type relative to a query 150. That is, interrogative inference system 142 identifies an interrogative type relative to a query 150 based on intent and language in the query 150. Variable identification system 144 identifies variables relative to a query 150. That is, variable identification model 144 identifies variable relative to a query 150 based on language in the query 150. Task identification system 146 identifies a task relative to a query 150. That is, task identification system 146 identifies a task relative to a query 150 based on language in the query 150. Interrogative types include descriptive, correlation, causation (actual causation), interventions, and counterfactuals. Some examples are provided below.

Interrogative types can include causal types (e.g., causation (e.g., actual cause), intervention, counterfactuals,) and non-causal types (e.g., descriptive and correlation). Thus, interrogative inference system 142 is configured to identify causal intent of a query 150 as well as other interrogative intent of a query 150 (e.g., non-causal intent).

Descriptive interrogative types are characterized by understanding what happened or what will happen. In one example, a query 150, having a descriptive interrogative type, could be: How was variable x (e.g., yield) distributed in my field 1 last year? Variable identification system 144 processes the query to identify the variable as variable x (e.g., yield) and interrogative inference system 142 processes the query to identify the interrogative type as descriptive, and task identification system 146 processes the query to identify the associated task to be describing a distribution of variable x (e.g., yield) at field 1 of the querying agricultural user 116. This is merely one example.

Correlation interrogative types are characterized by understanding associations between variables. In one example, a query 150, having a correlation interrogative type, could be: Is there a relationship between variable x (e.g., yield) and variable y (e.g., soil moisture)? Variable identification system 144 processes the query to identify the variables as variable x (e.g., yield) and variable y (e.g., soil moisture) and interrogative inference system 142 processes the query to identify the interrogative type as correlation, and task identification system 146 processes the query to identify the associated task as identifying a relationship (or correlation) between variable x (e.g., yield) and variable y (e.g., soil moisture). This is merely one example.

Causation (actual causation) interrogative types are characterized by representation of variables as a function. In one example, a query 150, having a causation (actual causation) interrogative type, could be: Did variable x (e.g., precipitation) cause variable y (e.g., yield) (or did lack of variable x (e.g., precipitation) cause low variable y (e.g., yield))? Variable identification system 144 processes the query to identify the variables as variable x (e.g., precipitation) and variable y (e.g., yield) and interrogative inference system 142 processes the query to identify the interrogative type as causation (actual causation), and task identification system 146 processes the query to identify the associated task as identifying the interrogative effect of variable x (e.g., precipitation) on variable y (e.g., yield). This is merely one example.

Intervention interrogative types are characterized by understanding intervening. In one example, a query 150, having an intervention interrogative type, could be: What would variable y (e.g., yield) be if I performed variable x (e.g., irrigation)? Variable identification system 144 processes the query to identify the variables as variable y (e.g., irrigation) and variable x (e.g., yield) and interrogative inference system 142 processes the query to identify the interrogative type as intervention, and task identification system 146 processes the query to identify the associated task as identifying the effect of variable y (e.g., irrigation) on variable x (e.g., yield).

Counterfactual interrogative types are characterized by imaging, retrospection, and understanding. In one example, a query 150, having a counterfactual interrogative type, could be: What would variable x (e.g., yield) be if variable y (e.g., fertilization) had not occurred? Variable identification system 144 processes the query to identify the variables as variable x (e.g., yield) and variable y (e.g., fertilization) and interrogative inference system 142 processes the query to identify the interrogative type as counterfactual, and task identification system 146 processes the query to identify the associated task as identifying the interrogative effect of not/no variable y (e.g., fertilizing) on variable x (e.g., yield).

In some examples, the scope of the task is not evident from a query 150. For instance, an initial query may not specify the scope. Taking the above example of a query 150 having a correlation interrogative type ("Is there a relationship between variable x (e.g., yield) and variable y (e.g., soil moisture)?"), query processing system 124 may generate a response in the form of a follow-up asking for clarity of scope, such as: Do you wish to know if there is a relationship between variable x (e.g., yield) and variable y (e.g., soil moisture) generally or at your farm? To which the querying agricultural user 116 might respond: At my farm. In which case, task identification system 146 processes the follow-up response (query) from the querying agricultural user 116 to further identify the task as identifying a relationship (or correlation) between variable x (e.g., yield) and variable y (e.g., soil moisture) at the farm of (or corresponding to) the querying agricultural user 116. In other examples, the query processing system 124 may not generate a response in the form of a follow-up asking for clarity in scope, rather, the query processing system 124 may be set to interpret scope as specific to the querying agricultural user 116 (e.g., specific to the farm of (or corresponding to) the querying agricultural user 116), or as specific to the querying agricultural user 116 and other similarly situated users (e.g., specific to the farms of other similarly situated users), or as general (e.g., across all available data). In one example, the scope setting may be adjustable. Where the scope is preset, task identification system 146 can identify the task in light of the preset scope.

Query processing system 124, after processing a query 150, generates an output 149, such as a prompt, that includes the identified variables, the identified interrogative type, and associated identified task. The output 149, or prompt, is provided to analytics engine 126. Analytics engine 126 then performs analytics, based on the output 149, and generates an output 170, responsive to the query 150, which can be provided (e.g., presented, such as by display, audible output, or a combination, etc.) to a user 116 via one or more user interface mechanisms 112 or can be provided to other querying sources (e.g., mobile work machines 104 or computing systems 300, or both) in other ways.

Analytics engine 126 includes model execution system 152, model generator 154, output determination system 156, output generator 158, and can include various other items 160.

Model execution system 152 interacts with data stores 122 to obtain desired data and executes one or more preprocessed models 136, using the obtained data, based on the output 149 and, in some examples, based on an output (e.g., prompt) of output determination system 156. For example, model execution system 152 may obtain one or more items of querying source context data 132 or one or more items of other source context data 134, or both, based on the output 149. Further, model execution system 152 may obtain one or more preprocessed models 136 in order to perform analytics on the one or more items of data based on the output 149.

Model generator 154 interacts with data stores 122 to obtain desired data and generates on or more generated models 138, using the obtained data, based on the output 149 and, in some examples, based on an output (e.g., prompt) of output determination system 156. For example, model generator 154 may obtain one or more items of querying source context data 132 or one or more items of other source context data 134, or both, based on the output 149. Further, model generator 154 may generate one or more generated models 138 in order to perform analytics on the one or more items of data based on the output 149. In some examples, depending on the query 150, a model may need to be generated. For example, where a query 150 indicates an interrogative type relative to data for a current season, a model may need to be generated. For instance, a query 150 may ask for a distribution of variable x (e.g., yield) for the current season, for which preprocessed model 136 may not yet exist. In such a case, model generator 154 generates a generated model 138 to perform analytics on variable x (e.g., yield) data for the current season (in querying agricultural user context data 132) to generate an output 170 that indicates the distribution of variable x (e.g., yield) for the current season. This is merely one example.

In some examples, the number and types of data obtained by model execution system 152 or by model generator 154, or both, from data stores 122, may be instructed by an output from output determination system 156. For example, output determination system 156 may generate an output instructing model execution system 152 or model generator 154 to perform certain analytics based on the prompt 149 and, in some examples, based on querying agricultural user context data 132.

For example, based upon the output 149 and querying source context data 132, output determination system 156 may determine that a particular type of output 170 (or an output 170 having particular features (e.g., display elements, information, etc.)) should be generated. A timing indicator that indicates where (i.e., when) the querying agricultural user 116 is at in the current season (as indicated by querying agricultural user context data 132), can be used by output determination system 156 to determine an output 170 to be generated and thus, analytics to be performed by model execution system 152 or by model generator 154. A location indicator that indicates a location (e.g., geographic location) of the querying source (e.g., querying agricultural user 116, mobile work machine 104, computing system 106, etc.), as indicated by querying source context data 132, can be used by output determination system 156 to determine an output 170 to be generated and thus, analytics to be performed by model execution system.

For example, where the timing indicates that an operation is currently being performed by the querying source, or by one or more work machines (e.g., 104) associated with the querying source, output determination system 156 can determine that the output 170 should include recommended machine settings for one or more of the querying source (where querying source is a work machine 104), or one or more machines 104 associated with the querying source, currently performing the operation. The recommended machine settings can include settings for each of one or more controllable subsystems of each of one or more work machines 104. Where output determination system 156 determines that output 170 should include suggested machine settings model execution system 152 may obtain one or more preprocessed models 136 capable of providing recommended machine settings, as well as obtaining necessary querying source context data 132 or other source context data 134, or both, for executing the one or more preprocessed models 136 to provide the recommended machine settings. Similarly, where output determination system 156 determines that output 170 should include recommended machine settings, model generator 154 may generate one or more models 138 capable of providing recommended machine settings, as well as obtaining necessary querying source context data 132 or other source context data 134, or both, for executing the one or more models 138 to provide the recommended machine settings.

One example of providing recommended machine settings follows. Query execution system 102 may obtain a query 150 such as: How can I increase yield? Query processing system 124 processes the query and generates an output 149 identifying the interrogative type as intervention, the variables as unknown and yield, and the task as determining what will increase yield. Based upon the output 149 and a timing indicator in querying source data 132 indicating that the querying source (or one or more work machines 104 associated with the querying source) is currently performing a harvesting operation, output determination system 156 determines that an output 170 should include recommended machine settings for the querying source or one or more work machines 104 associated with the querying source performing the current harvesting operation. Model execution system 152 or model generator 154, or both, will execute their functionality based on the determination of output determination system 156 and analytics will be performed to generate an output 170 responsive to the query 150 (e.g., will include information indicating what can increase yield and perhaps, by how much) and a recommended machine setting (e.g., decrease harvester speed to 2 miles per hour).

In another example, where the timing indicator indicates that an operation is not currently underway, output determination system 156 can determine that the output 170 should include suggested prescriptions for use in controlling the querying source (e.g., where the querying source is a work machine 104) or one or more of the work machines 104 associated with the querying source. The prescriptions can include recommended operation parameters (including operation type, operation timing, machine distribution/assignment, as well as various other operation parameters), recommended individual machine settings for each of the one or more machines (e.g., application rates, depth, height, speed, etc.) during a recommended future operation, as well as various other prescriptions. Where output determination system 156 determines that output 170 should include recommended prescriptions, model execution system 152 may obtain one or more preprocessed models 136 capable of providing recommended prescriptions, as well as obtaining necessary querying source context data 132 or other source context data 134, or both, for executing the one or more preprocessed models 136 to provide the recommended prescriptions. Similarly, where output determination system 156 determines that output 170 should include recommended prescriptions, model generator 154 may generate one or more models 138 capable of providing recommended prescriptions, as well as obtaining necessary querying source context data 132 or other source data 134, or both, for executing the one or more models 138 to provide the recommended parameters.

One example of providing recommended prescriptions follows. Query execution system 102 may obtain a query 150 such as: How can I increase yield? Query processing system 124 processes the query and generates an output 149 identifying the interrogative type as intervention, the variables as unknown and yield, and the task as determining what will increase yield. Based upon the output 149 and a timing indicator in querying source data 132 indicating that the querying source (or work machines 104 associated with the querying source) is not currently performing an operation and further, that it has been two weeks since corn plants have been planted, output determination system 156 determines that an output 170 should include recommended prescriptions. Model execution system 152 or model generator 154, or both, will execute their functionality based on the determination of output determination system 156 and analytics will be performed to generate an output 170 responsive to the query 150 (e.g., will include information indicating what can increase yield and perhaps, by how much) and a recommended prescription (e.g., apply nitrogen at 200 pounds per acre).

A location indicator may be used to refine or select machine settings or prescriptions provided in an output. For example, a location indicator indicating that a work machine 104 is at a given location in a worksite during a current operation, may dictate one setting over another type of setting. For example, while changing one setting in one way may increase performance, in at least one respect, given the location on the field (and characteristics associated therewith) performance may be unacceptably affected in other ways. Additionally, there may be particularities about a location of a querying source that may be useful in refining or selecting a prescription. For example, a location indicator indicating that querying source is in a given location may dictate on prescription over another type of prescription. For example, while one prescription may increase performance, in a least one respect, given the location (and characteristic associated therewith) performance may be unacceptably affected in other ways.

It will be understood that analytics engine 126 can include filtering logic (e.g., as part of other 160) that is capable of identifying data (e.g., querying source context data 132, other source context data 134, etc.) necessary for performing analytics responsive to a query. The filtering logic may filter (or sort) the data to illustratively identify and retrieve only necessary data for analysis responsive to a query. As an example, but not by limitation, the filtering logic may be configured to, in response to a query 150, filter other source context data 134 to only retrieve other source context data 134 that is similar to the querying source. Thus, the filtering logic, in one example, may cluster like data with like data.

As will be discussed in more detail below, one or more agricultural work machines 104 may be controlled based on an output 170, including, for example, based on recommended machine settings or recommended prescriptions of an output 170.

In addition to determining whether the output 170 should include recommended machine settings or recommended prescriptions, output determination system 156 can determine the manner in which the outputs of preprocessed models 136 or generated models 138, or both, should be presented based on outputs 149 and, in some examples, based on querying source context data 132. For example, output determination system 156 can determine whether the output 170 should be a display or another type of presentation, such as an audible presentation, or both. Additionally, output determination system 156 can determine features of the output 170 such as what information should be presented and how the information should be presented, what information should be presented audibly, as well as various other features. For example, output determination system 156 can determine the types of indications (e.g., display elements, etc.) that should be included with an output 170 including or in the form of a display. For instance, output determination system 156 can determine whether information should be displayed as a map (e.g., a map of a worksite, or a map of multiple worksites or all worksites (e.g., a whole farm, etc.)), whether information should be displayed in a graph as well as the type of graph that should be used. For example, where an output 149 indicates that a distribution of a variable (e.g., yield, etc.) for one or more worksites is to be provided, output determination system 156 may determine that a map showing the distribution of the variable at the one or more worksites should be provided as part of the output 170. In another example, where an output 149 indicates that a variable total (e.g., total yield, etc.) for one or more worksites over a number of years is to be provided, output determination system 156 may determine that a bar graph should be provided. In another example, where the output 149 indicates that a correlation between variables or a causal relationship (e.g., actual cause) relative to variable is to be provided, output determination system 156 may determine that a line graph illustrating a function (e.g., a regression) should be provided. In another example, where the output indicates that a counterfactual (e.g., what would yield have been had the fertilizer been applied, etc.) is to be provided, output determination 156 may determine that a bar graph indicating the actual outcome and the counterfactual outcome should be provided. These are merely some examples.

It will be understood that the elements are not limited to graphs and maps. In some examples, an output 170 may include, as an element, a word or letters or a number or another characters, or a combination thereof. For example, where the output 149 indicates that a variable (e.g., total yield, etc.) for a worksite or across multiple worksite or across all worksites (e.g., an entire farm, etc.) for a job or season is to be provided, output determination 156 may determine that one of or a combination of numbers, letters, and words (e.g., "10,000", or "10,000 bushels", or "10,000 bu".) should be provided. Keeping with the previous example, instead of a display element, output determination 156 may determine that an audible output should be provided (e.g., audible speech saying "ten thousand" or "ten thousand bushels" or "ten thousand bu"). In another example, where the output 149 indicates that a cause of a variable (e.g., the lodged crop) at one or more worksites is to be provided, output determination 156 may determine that words (audible or displayed, or both) should be provided (e.g., "the lodged crop at your field(s) was caused by high winds at your one or more field(s) occurring on July 16 and the lodged crop being of a hybrid having low lodging resistance"). In another example, the output may comprise a time sequence of images or a video such as an animation of changes of a mapped attribute (e.g., crop attribute, etc.) across a job or season. In other examples, these and other elements may be combined such as a video with overlayed text and graphics. These are merely some examples.

Based on the determination output of output determination system 156 and based on the output(s) of one or more models 136 or 138, or both, output generator 158 generates an output 170. Output 170 can be provided to one or more work machines 104 or to one or more computing systems 106, or both, via one or more networks 118. Output 170 can be presented to a user 116 through a user interface mechanism 112. Additionally, as will be described below, the output 170 can be utilized by a user 116 or by one or more mobile agricultural work machines 104, or both, to control operation of one or more mobile agricultural work machines 104.

It will be understood that while the example shown in FIG. 1 illustrates items being distributed across operations computing system architecture 100 in a particular way, in other examples, one or more of the items shown in FIG. 1 can be, alternatively or additionally, located elsewhere. For example, but not by limitation, query execution computing system 102, or items thereof, may be disposed on a computing system 106 or on a work machine 104, or both. Thus, it will be understood that the items in operations computing system architecture 100 can be distributed in various ways, including ways that differ from the example shown in FIG. 1.

Figure 2:
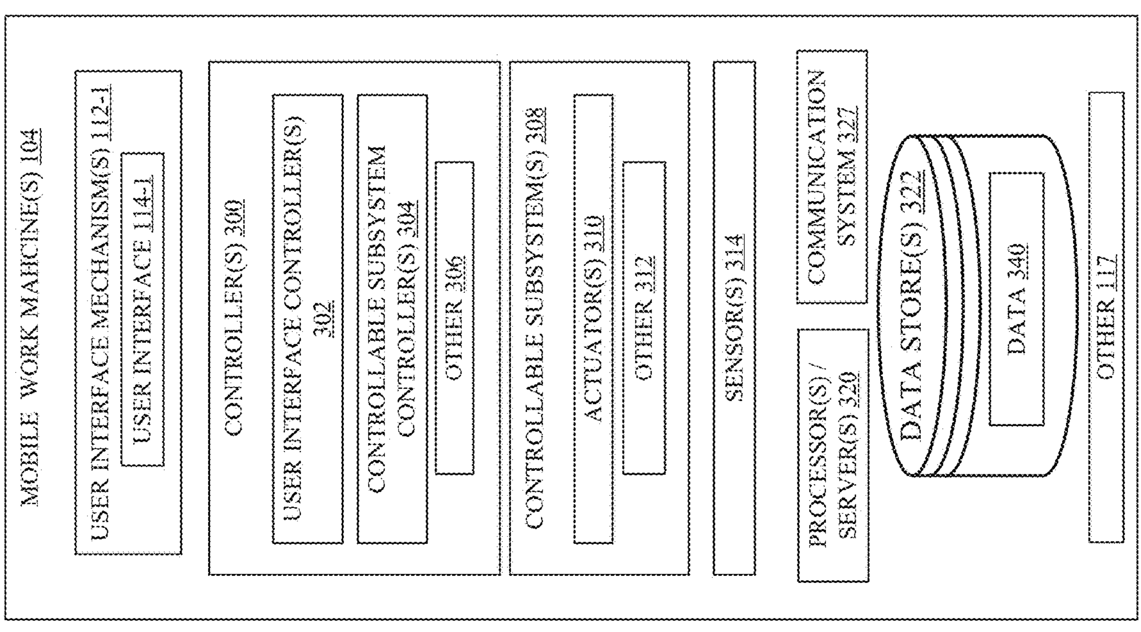
FIG. 2 is a block diagram of example mobile agricultural work machines and example agricultural user associated computing systems, of agricultural computing system architecture, in more detail.
Figure 2:
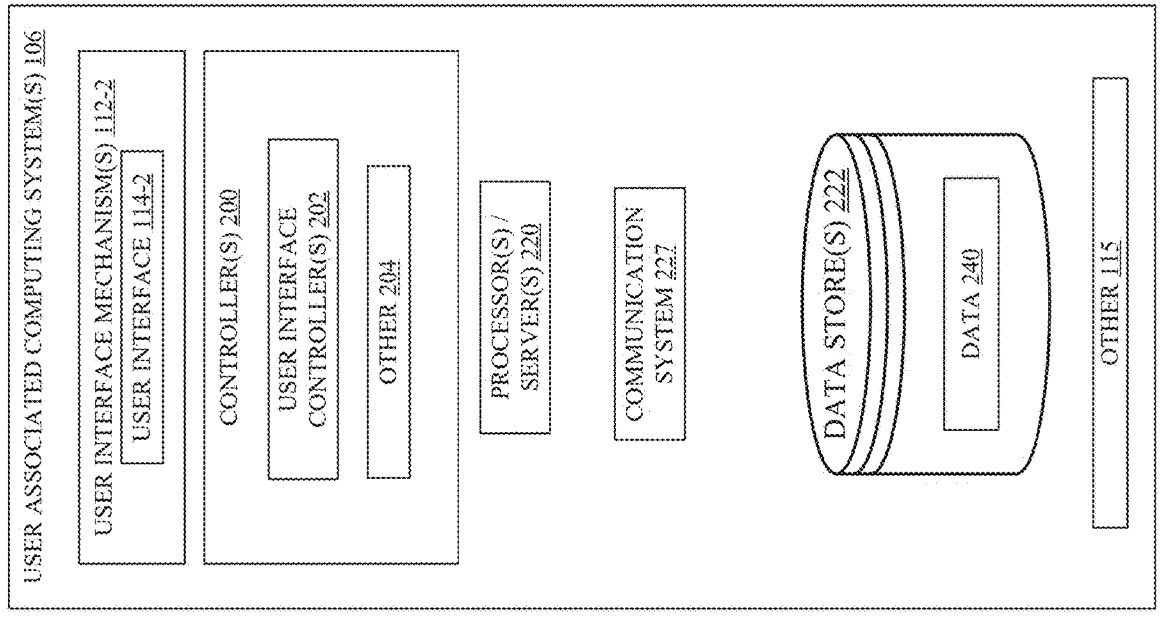

FIG. 2 is a block diagram showing mobile work machines 104 and computing systems 106 in more detail.

Computing systems 106 can be a wide variety of different types of systems, or combinations thereof. For example, computing systems 106 can be computing systems such as mobile devices (e.g., smart phones, laptops, tablets, as well as other types of mobile devices), personal computers (e.g., desktops), a remote network, a farm manager system, a vendor system, or a wide variety of other computing systems.

Mobile work machines 104 can be a wide variety of different types of off-road mobile work machines. For example, mobile work machines 104 can be mobile agricultural machines, such as mobile agricultural harvesting machines, mobile agricultural tillage machines, mobile agricultural planting machines, mobile agricultural product application machines (e.g., fluid sprayers, solid material applicators (e.g., spreaders), etc.), mobile agricultural support machines (e.g., grain carts, grain trucks, tender vehicles, etc.), as well as various other types of mobile agricultural work machines. Mobile work machines 104 can also be mobile construction or earth moving machines (e.g., dump trucks, backhoes, excavators, loaders, dozers, graders, scrapers, skid steers, etc.), mobile turf management machines (e.g., mowers, rake machines, shredder machines, aeriation machines, etc.), or mobile forestry machines (e.g., forestry harvesters, feller bunchers, shovel loggers, skidders, knuckleboom loaders, etc.). In some examples, mobile work machines 104 include a towing vehicle (e.g., a tractor, truck, etc.) and a towed implement. In some examples, mobile work machines 104 are self-propelled (i.e., the machine that carries the implement also includes propulsion means). In some examples mobile work machines 104 include components (e.g., tools, implements, etc.) that engage a worksite (e.g., field) or engage with material (e.g., vegetation, etc.) at the worksite, or both.

As shown in FIG. 2, mobile work machines 104 and computing systems 106 can include one or more user interface mechanisms 112 (illustratively shown as 112-1 and 112-2 respectively). Users may interact with or operate, or both, mobile work machines 104 or computing systems 106, or both, through user interface mechanisms 112. User interface mechanisms 112 can include joysticks, levers, a steering wheel, linkages, keyboards, point and click devices (e.g., a mouse, etc.), pedals, buttons, wireless devices (e.g., mobile computing devices, etc.), dials, keypads, a display screen including user interactable display elements (such as icons, buttons, windows, menus, etc.), a microphone and speaker (where speech recognition and speech synthesis are provided), among a wide variety of other types of user interface mechanisms. In some examples, a user interface mechanism 112 includes a display screen controllable to display a user interface 114, such as a graphical user interface (GUI). In some examples, the display may be touch sensitive, in which case users may interact with the display using touch gestures. The examples described above are provided as illustrative examples and are not intended to limit the scope of the present disclosure. Consequently, other types of user interface mechanisms may be used and are within the scope of the present disclosure.

As shown in FIG. 2, mobile work machines 104 include a communication system 327 and computing systems 106 include a communication system 227. Communication system 227 provides for communication between items of a computing system 106 as well as between a computing system 106 and other items of computing system architecture 100. A communication system 327 provides for communication between items of a mobile work machine 104 as well as between a mobile work machine 104 and other items of computing system architecture 100. Communication system 327 or communication system 227, or both, can include wired communication circuitry or wireless communication circuity, or both, as well as wired communication components or wireless communication components, or both. In some examples, communication system 227 or communication system 327, or both, can be a cellular communication system, a system for communication over a wide area network (WAN), a system for communication over a local area network (LAN), a system for communication over a controller area network (CAN), such as a CAN BUS, a system for communication over a near field communication network, or a system for communication over any of a wide variety of other networks, or a system for communication over a combination of the previously described networks. Communication system 227 or communication 327, or both, can include a system that facilitates downloads or transfers of information to and from a secure digital (SD) card or a universal serial bus (USB) card, or both.

Mobile work machines 104 can include one or more processors or servers 320 and one or more data stores 322. Computing systems 106 can include one or more processors or servers 220 and one or more data stores 222. Data stores 222 include various data 240. Data stores 322 include various data 340. Data 240 or data 340, or both, can include some or all of querying source context data 132, other source context data 134, preprocessed models 136, generated models 138, and other data 140, as well as various other data. Data 240 can include computer executable instructions that are executable by one or more processors or servers 220 to implement other items or functionalities of computing systems 106, as well as various other data. Data 340 can include computer executable instructions that are executable by one or more processors or servers 320 to implement other items or functionalities of mobile work machines 104, as well as various other data. It will be understood that data stores 222 or data stores 322, or both, can include different forms of data stores, for instance one or more of volatile data stores (e.g., Random Access Memory (RAM)) and non-volatile data stores (e.g., Read Only Memory (ROM), hard drives, solid state drives, etc.).

Computing systems 106 can include one or more controllers 200 that are operable to generate control signals to control various items of computing systems 106. Controllers 200 include one or more user interface controllers 202 and can include various other controllers 204. User interface controllers 202 are operable to control user interface mechanisms 112-2, such as to control user interface mechanisms 112-2 to generate a user interface 114-2 based on an output 170.

Mobile work machines 104 can include one or more controllers 300 that are operable to generate control signals to control various items of mobile agricultural work machines 104. Controllers 300 include one or more user interface controllers 302, one or more controllable subsystem controllers 304, and can include various other controllers 306. User interface controllers 302 are operable to control user interface mechanisms 112-1, such as to control user interface mechanisms 112-1 to generate a user interface 114-1 based on an output 170. Controllable subsystem controllers 304 are operable to control controllable subsystems 308, for example based on an output 170 or based on user input (or other user interaction) with user interface mechanisms 112-1, or both.

Controllable subsystems 308 include one or more actuators 310 and can include various other items 312 as well. Actuators 310 are controllable to control operation of mobile work machines 104. Actuators 310 can include any of a variety of different types of actuators, including, but not limited to, electromechanical actuators, electrical actuators, hydraulic actuators, pneumatic actuators, as well as other types of actuators. Some examples of actuators 310 include motors, internal combustion engines, pumps, valves, hydraulic cylinders, pneumatic cylinders, linear actuators, as well as various other actuators. As discussed, actuators 310 are controllable to control operation of mobile agricultural work machines 104, for example to control travel speed, to control travel direction, to control operational speed of various components of mobile work machines 104, to control position of various components of mobile work machines 104, to control orientation (e.g., pitch, roll, and yaw) of various components of mobile work machine 104, to control state (e.g., on or off, opened or closed, etc.) of various components of mobile work machines 104, to control displacement of various components of mobile work machines 104, as well as to control various other operational parameters. It will be understood that controllable subsystems 308 may vary with the type of mobile work machine 104.

As shown, in FIG. 2, mobile work machines 104 can include one or more sensors 104. Sensors 104 can include any of a variety of different types of sensors. Sensors 104 can detect characteristics of the worksite (e.g., topographic characteristics, soil characteristics, etc.), characteristics of vegetation (crop and non-crop vegetation) at the worksite, characteristics of the environment of the worksite (e.g., weather characteristics, etc.), characteristics of the work machine (e.g., geographic position, speed, heading, pitch, roll, yaw, operational parameters, performance characteristics, etc.), as well as various other characteristics. As previously discussed, sensors 104 can provide some of querying source context data 132 and similar sensors on other mobile work machines of (or corresponding to) other sources 189 can provide some of other source context data 134.

Computing systems 106 can include various other items or functionalities 115. Mobile work machines 104 can include various other items or functionalities 117.

Figure 3:
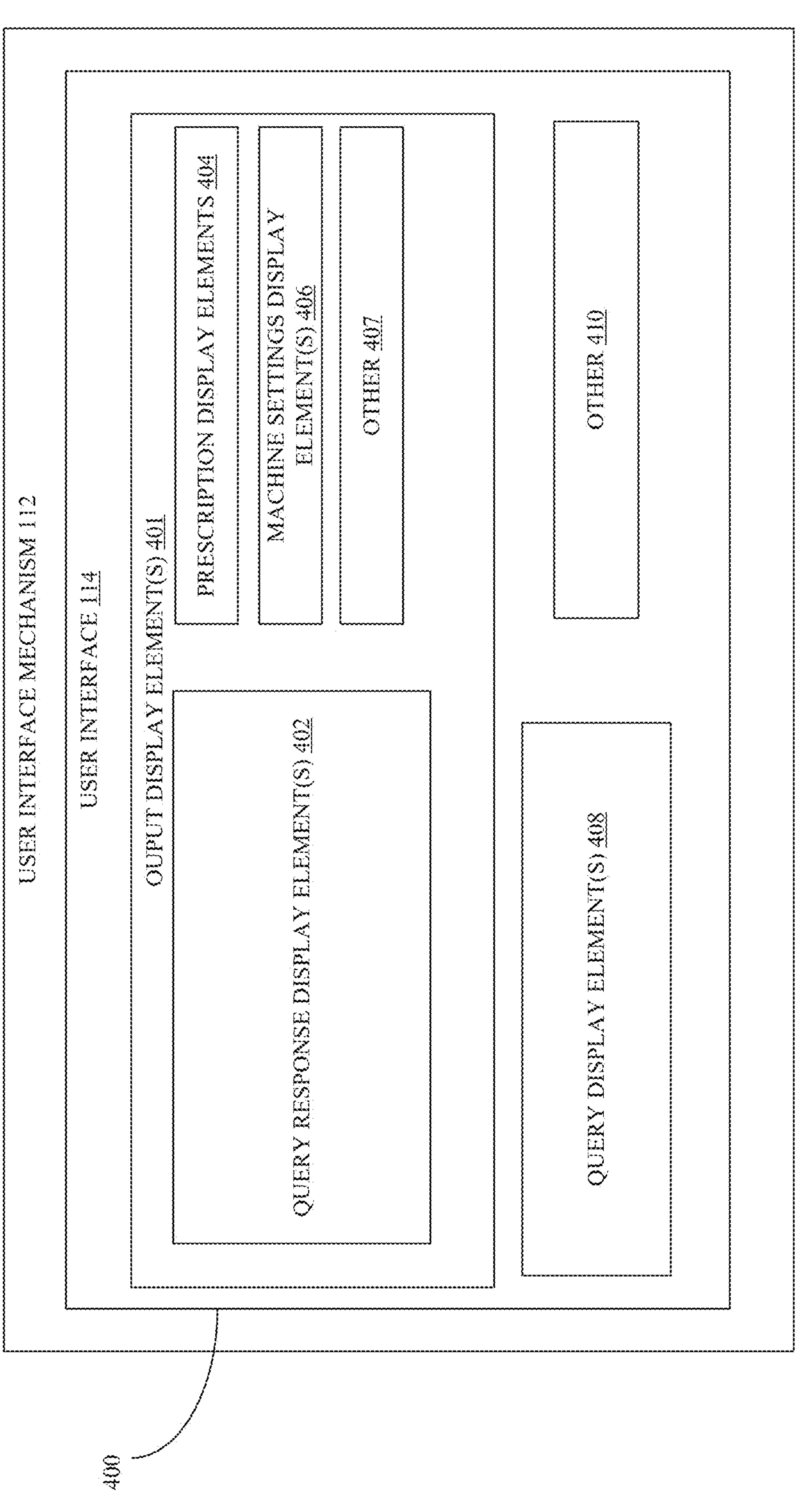
FIG. 3 is a block diagram showing one example user interface.

FIG. 3 is a block diagram showing one example of a user interface 114 in more detail. User interface 114 in FIG. 3 can be displayed as a user interface 114-1 or as a user interface 114-2. As illustrated in FIG. 3, user interface 114 is a graphical user interface (GUI) displayed on a display screen 400 of a user interface mechanism 112. Interface mechanism 112, in FIG. 3, comprises a computing device, such as a mobile device, a personal computer, an infotainment system, or another type of computing device having a display screen. Interface mechanism 112 in FIG. 3 could be a user interface mechanism 112-1 or a user interface mechanism 112-2.

As illustrated in FIG. 3, user interface 114 includes one or more output display elements 401, query display elements 408, and can include various other display elements 410 as well. Output display elements 401 are display elements corresponding to an output 170, that is, are display elements that display information provided by an output 170.

Output display elements 401 include one or more query response display elements 402, one or more prescription display elements 404, one or more machine settings display elements 406, and can include various other display elements 407, as well.

Query response display elements 402 display information responsive to a query 150 provided by an output 170. Query response display elements 402 can include images, such as images of graphs, map images, as well as various other images, depicting information responsive to a query 150 input by a querying source. Graphs can include statistical graphs, such as line graphs, bar graphs/charts, pie charts, histograms, scatter plots, area charts, box plots, etc. Graphs can include exponential graphs. Graphs can include logarithmic graphs. Graphs can include various other types of graphs. Map images can include map images of one or more worksites (e.g., fields, etc.) and can include variable indicators (colors, patterns, values, etc.) that represent information, such as values of one or more variables, as well as legends that define what the indicators represent. The indicators can be georeferenced, that is, each indicator can be displayed at a location in the map image that corresponds to the position in the worksite to which the variable (represented by the indicator) corresponds. Query response display elements 402 can also include textual display elements (e.g., text boxes, etc.) that display words, letters, numbers, and other characters, or combinations thereof, in text form.

Prescription display elements 404 display suggested prescriptions provided by an output 170. Prescription display elements 404 can include images, such as prescription map images. The prescription map images can include prescription map images of one or more worksites (e.g., fields, etc.) and can include indicators (colors, patterns, values, etc.) that represent information, such as prescription values, as well as legends that define what the indicators represent. The prescription indicators can be georeferenced, that is, each prescription indicator can be displayed at a location in the map image that corresponds to the position of the information the prescription indicator represents in the worksite. The prescription values can include prescribed material application rates, prescribed machine settings (e.g., speed, such as travel speed or operating speed of individual components, position (e.g., height, depth, or spacing of components), orientation, routes, as well as various other machine settings), as well as various other prescription values. Prescription display elements 404 can also include textual display elements (e.g., text boxes, etc.) that display words, letters, numbers, and other characters, or combinations thereof, in text form. Prescription display elements 404 can include various other types of display elements. In some examples, prescription display elements 404 may be user actuatable (e.g., by touch input) and actuation may act as user authorization for instituting the recommended prescriptions or may cause the user interface mechanism 112 to alter the interface 114 to generate a display of a menu that allows the user to institute the prescriptions.

Machine settings display elements 406 display recommended machine settings provided by an output 170. Operation parameter display elements can include textual display elements (e.g., text boxes, etc.) that display words, letters, numbers, and other characters, or combinations thereof, in text form. Machine settings display elements 406 can include various other types of display elements. In some examples, machine settings display elements 406 may be user actuatable (e.g., by touch input) and actuation may act as user authorization for instituting the recommended machine settings or may cause the user interface 112 to alter the interface 114 to generate a display of a machine settings menu that allows the user to adjust the machine settings.

User interface 114 can include various other display elements 410. Query display elements 408 comprise a dialogue interface area for providing for user input of queries 150 and display of queries 150 and responses from query execution system 102. In one example, query display elements 408 includes an input field (text input field) display element, a software keyboard display element, an enter or send button display element, and a dialogue feed display field display element. A user 116 can interact (e.g., via touch input, etc.) with the software keyboard to input text (letters, numbers, other characters) to compose a query 150 which is displayed for review in the input field display element. When a user 116 wishes to submit a composed query 150, the user 116 can interact (e.g., via touch input, etc.) with the enter or send button display element. The submitted query 150 will be displayed in the dialogue feed display element. A response to the submitted query 150 may be provided by query execution computing system 102 and the response can be displayed in the dialogue feed display element. Submitted queries 150 and responses from query execution computing system 102 can be differentiated in the dialogue feed display element in various ways including by difference in color or position, or both. Queries and responses can remain displayed in the dialogue feed display element and subsequent queries and responses can be displayed, in a feed-style manner, below previous queries and responses. In some examples, user interface mechanism 112 may support audible input and output, in which case, a user may, additionally, or alternatively, compose a query 150 via audible speech and the responses from query execution system 102 may additionally, or alternatively, be output via audible speech. The query display elements 150 may include a button or toggle to switch audible input and output functionality on and off.

It will be understood that interface 114, as shown in FIG. 3, can include various types of display elements such as buttons, breadcrumbs, checkboxes, dropdowns, forms, icons, input fields, toggles, steppers, tags, tab bars, sidebars, search fields, radio buttons, progress bars, pickers, notifications, paginations, menus, modals, loaders, feeds, carousels, cards, accordions, as well as various other types of display elements.

Figure 4:
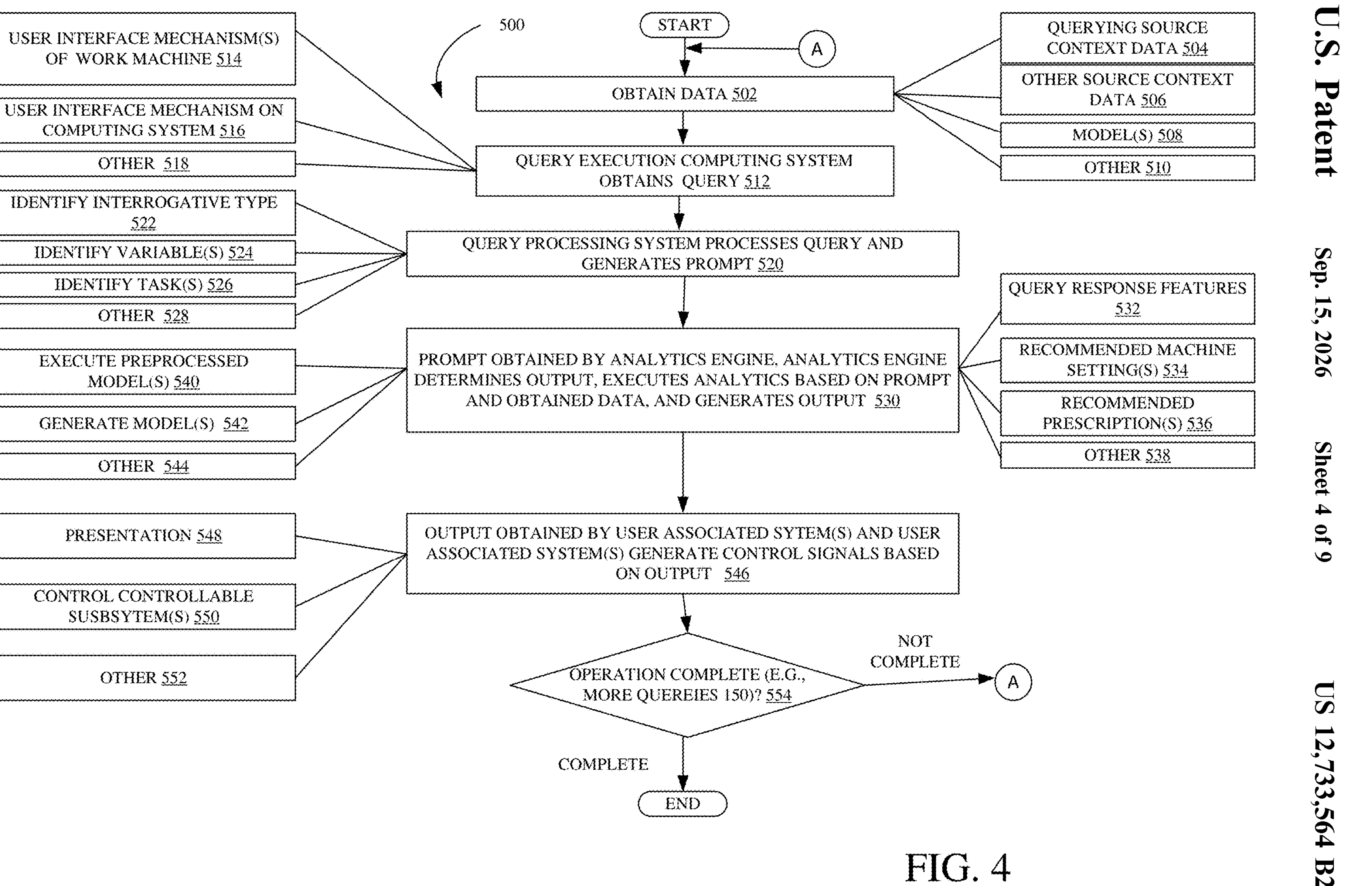
FIG. 4 shows a flow chart illustrating one example of operation of agricultural computing system architecture.

FIG. 4 shows a flow diagram illustrating one example operation 500 of operations computing system architecture 100.

Operation 500 begins at block 502 where various data are obtained. As indicated by block 504, the data can include querying source data 132. As indicated by block 506, the data can include other source context data 134. As indicated by block 508, the data can include models, such as preprocessed models 136 or generated models 138, or both. The data can be any of wide variety of other data, as indicated by block 512.

At block 512, query execution computing system obtains a query 150. As indicated by block 514, a query 150 can be provided to query execution computing system 102 through user interface mechanisms 112 (e.g., 112-1) of a mobile work machine 104. As indicated by block 516, a query 150 can provide to query execution computing system 102 through user interface mechanisms 112 (e.g., 112-2) of a user associated computing system 106. A query 150 can be obtained by query execution computing system in a variety of other ways as well, as indicated by block 518, for example, but not by limitation, and as previously described, a query 150 can be provided by a work machine 104 or a computing system 300 without the need for a user 116. As previously mentioned, and as will be understood, in some examples, a query 150 may provide some of the data described at block 502, for example, a query 150 may include some items of querying source context data 150.

At block 520 query processing system 124 processes the obtained query 150 and generates an output (or prompt) 149. Query processing system 124 (e.g., interrogative inference system 142) can process the obtained query 150 to identify an interrogative type (e.g., causal type or non-causal type) relative to the obtained query 150, as indicated by block 522. Query processing system 124 (e.g., variable identification system 142) can process the obtained query to identify one or more variables relative to the obtained query, as indicated by block 524. Query processing system 124 (e.g., task identification system 146) can process the obtained query to identify a task relative to the obtained query 150, as indicated by block 526. Query processing system 124 can process the obtained query 150 in a variety of other ways, as indicated by block 528. Thus, query processing system 124 processes the obtained query 150 and generates an output (or prompt) 149 indicative of an interrogative type, one or more variables, a task, and possibly other items, relative to the obtained query 150.

At block 530, the output (or prompt) 149 is obtained by analytics engine 126. Analytics engine 126 (e.g., output determination system 156) determines an output 170 and executes (e.g., model execution system 152 or model generator 154, or both) analytics based on the obtained output (or prompt) 149 and data obtained at block 502. For example, as indicated by block 532, analytics engine 126 (e.g., output determination system 156) may determine query response features (e.g., display elements, etc.) to be provided by output 170, such as whether the output 170 should include graphs, maps, text, etc., whether the output 170 should be displayed or audibly output, or both, as well as various other features. Additionally, analytics engine 126 (e.g., output determination system 156) may determine whether the output should include recommended machine settings, as indicated by block 534. Additionally, analytics engine 126 (e.g., output determination system 156) may determine whether the output should include recommended prescriptions, as indicated by block 536. Whether to provide recommended machine settings or recommended prescriptions may be based, at least in part, on a timing indicator, indicative of whether an operation is currently underway. Analytics engine 126 (e.g., output determination system 156) may determine if the output 170 should include various other features, as indicated by block 538. As indicated by block 540, analytics engine 126 (e.g., model execution system 152) may execute one or more preprocessed models 136 to execute analytics based on the output (or prompt) 1480, the data obtained at block 502, and, in some examples, an output (or determination) of output determination system 156. As indicated by block 542, analytics engine 126 (e.g., model generator 154) may generate one or more generated models 138 to execute analytics based on the output (or prompt) 149, the data obtained at block 502, and, in some examples, an output (or determination) of output determination system 156. As indicated by block 544, analytics can be executed in various other ways, including, but not limited to, both model execution system 152 executing one or more preprocessed models 136 and model generator 154 generating one or more generated models 138 to execute analytics. Analytics engine 126 (e.g., output generator 158) then generates an output 170.

At block 546, output 170 is obtained by one or more user associated systems (e.g., one or more mobile work machines 104 or one or more user associated computing systems 106, or both) and the one or more user associated systems generate control signals based on the obtained output 170. As indicated by block 548, the one or more user associated systems can generate control signals to control user interface mechanisms 112 to present the obtained output 170 (or information therein) to a user 116. Presenting the obtained output 170 (or information therein) to a user 116 can include controlling user interface mechanisms 112 to generate a user interface 114, such as the user interface 114 shown in FIG. 3, or another type of user interface 114. For example, at block 548, an agricultural user associated computing system 106 (e.g., user interface controllers 202) can generate control signals to control a user interface mechanism 112-2 to present the obtained output 170 by generating a user interface 114-2 (which can be similar to the user interface 114 shown in FIG. 3 or can be another type of user interface 114). In another example, at block 550, a mobile work machine 104 (e.g., user interface controllers 302) can generate control signals to control a user interface mechanism 112-1 to present the obtained output 170 by generate a user interface 114-1 (which can be similar to the user interface 114 shown in FIG. 3 or can be another type of user interface 114). Alternatively, or additionally, as indicated by block 550, the one or more user associated systems can generate control signals to control one or more controllable subsystems 308 of one or more mobile work machines 104. For example, at block 550, a mobile work machine 104 (e.g., controllable subsystem controllers 304) can generate control signals to control one or more controllable subsystems 308, such as one or more actuators 310, based on the output 170. For example, but not by limitation, at block 550, a mobile work machine 104 (e.g., controllable subsystem controllers 304) can generate control signals to control one or more controllable subsystems 308, such as one or more actuators 310, based recommended machine settings or recommended prescriptions provided by the output 170. The machine control at block 550 can, in some examples, can be performed automatically. By automatically, it is meant, for example, that the machine control is performed without further human involvement except, perhaps, to initiate or authorize it. In other examples, machine control at block 550 can be in response to manual inputs by a user 116 (e.g., operator), such as manual inputs setting the recommended machine settings or setting the recommended prescriptions, in response to which, the work machines 104 generate control signals. As indicated by block 552, the querying user associated systems can generate control signals to control various other items.

At block 554, it is determined if the operation 500 is complete. Determining whether the operation is complete may include determining whether there are additional queries 150 to process. If it is determined that the operation is complete, then the operation ends. If it is determined that the operation at the worksite is not complete (e.g., there are more queries 150), then operation returns to block 502.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual (e.g., software) keyboard or other virtual (e.g., software) actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, engines, generators, logic, components, and interactions. It will be appreciated that any or all of such systems, engines, generators, logic, components, and interactions may be implemented by hardware items, such as one or more processors, one or more processors executing computer executable instructions stored in memory, memory, or other processing components, some of which are described below, that perform the functions associated with those systems, engines, generators, logic, components, or interactions. In addition, any or all of the systems, engines, generators, logic, components, and interactions may be implemented by software that is loaded into a memory and is subsequently executed by one or more processors or one or more servers or other computing component(s), as described below. Any or all of the systems, engines, generators, logic, components, and interactions may also be implemented by different combinations of hardware, software, firmware, etc., some examples of which are described below. These are some examples of different structures that may be used to implement any or all of the systems, engines, generators, logic, components, and interactions described above. Other structures may be used as well.

Additionally, various models have been discussed. Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make use of networks of data values such as neural networks. These are just some examples of models. Additionally, models may be generated in a variety of ways including with employment of artificial intelligence (e.g., machine learning, etc.) method, including, without limitation, memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Figure 5:
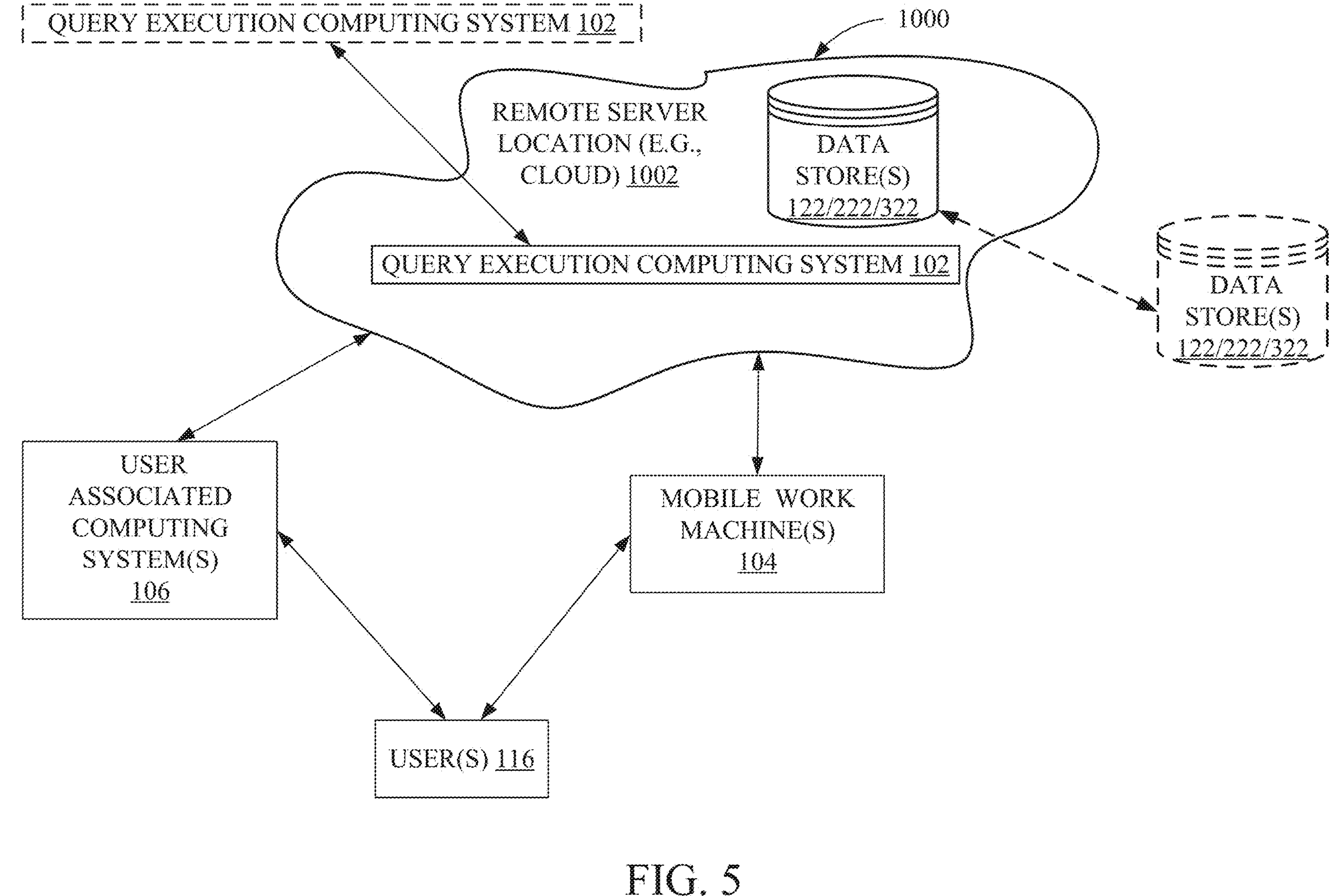
FIG. 5 is a block diagram showing one example of items of an agricultural computing system architecture in communication with a remote server architecture.

FIG. 5 is a block diagram of a remote server architecture 1000. FIG. 5, also shows one or more mobile work machines 104 and one or more user associated computing systems 106 in communication with the remote server environment. The mobile work machines 104 and user associated computing systems 106 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 5, some items are similar to those shown in previous figures and those items are similarly numbered. FIG. 5 specifically shows that query execution computing system and one or more of data stores 122, 222, and 322, may be located at a server location 1002 that is remote from the mobile work machines 104 and user associated computing systems 106. Therefore, in the example shown in FIG. 5, mobile work machines 104 and user associated computing systems 106 access systems through remote server location 1002. In other examples, various other items may also be located at server location 1002, such as various other items of operations computing system architecture 100.

FIG. 5 also depicts another example of a remote server architecture. FIG. 5 shows that some elements of previous figures may be disposed at a remote server location 1002 while others may be located elsewhere. By way of example, one or more of data store(s) 122, 222, and 322 may be disposed at a location separate from location 1002 and accessed via the remote server at location 1002. Similarly, query execution computing system 102 may be disposed at a location separate from location 1002 and accessed via the remote server at location 1002. Regardless of where the elements are located, the elements can be accessed directly by mobile work machines 104 and user associated computing systems 106 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., mobile work machine 104) comes close to the machine containing the information collection system, such as a fuel truck prior to fueling, the information collection system collects the information from the mobile machine using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on a mobile machine until the mobile machine enters an area having wireless communication coverage. The mobile machine, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 6:
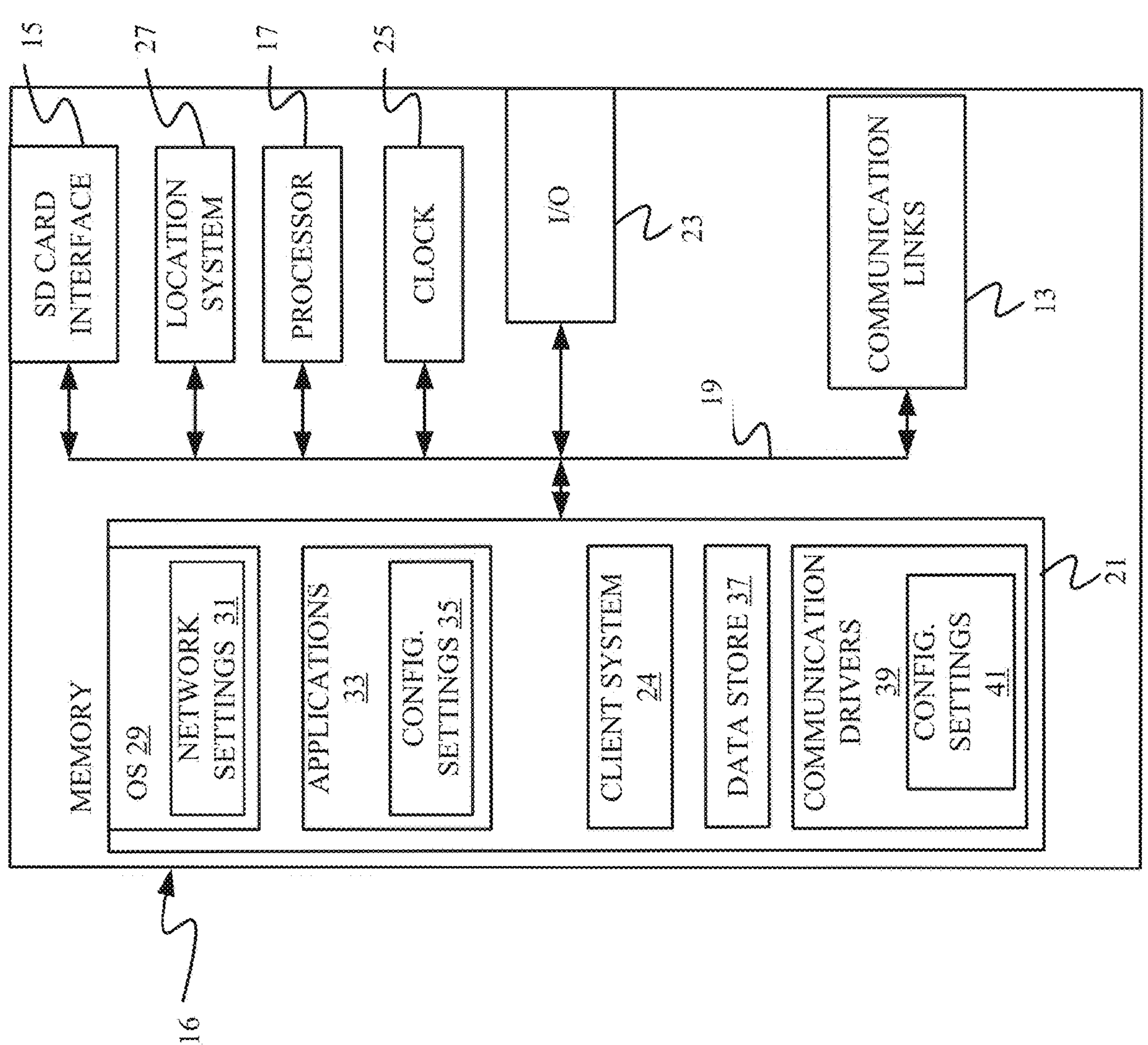
FIGS. 6-8 show examples of mobile devices that can be used in an agricultural computing system architecture.
Figure 7:
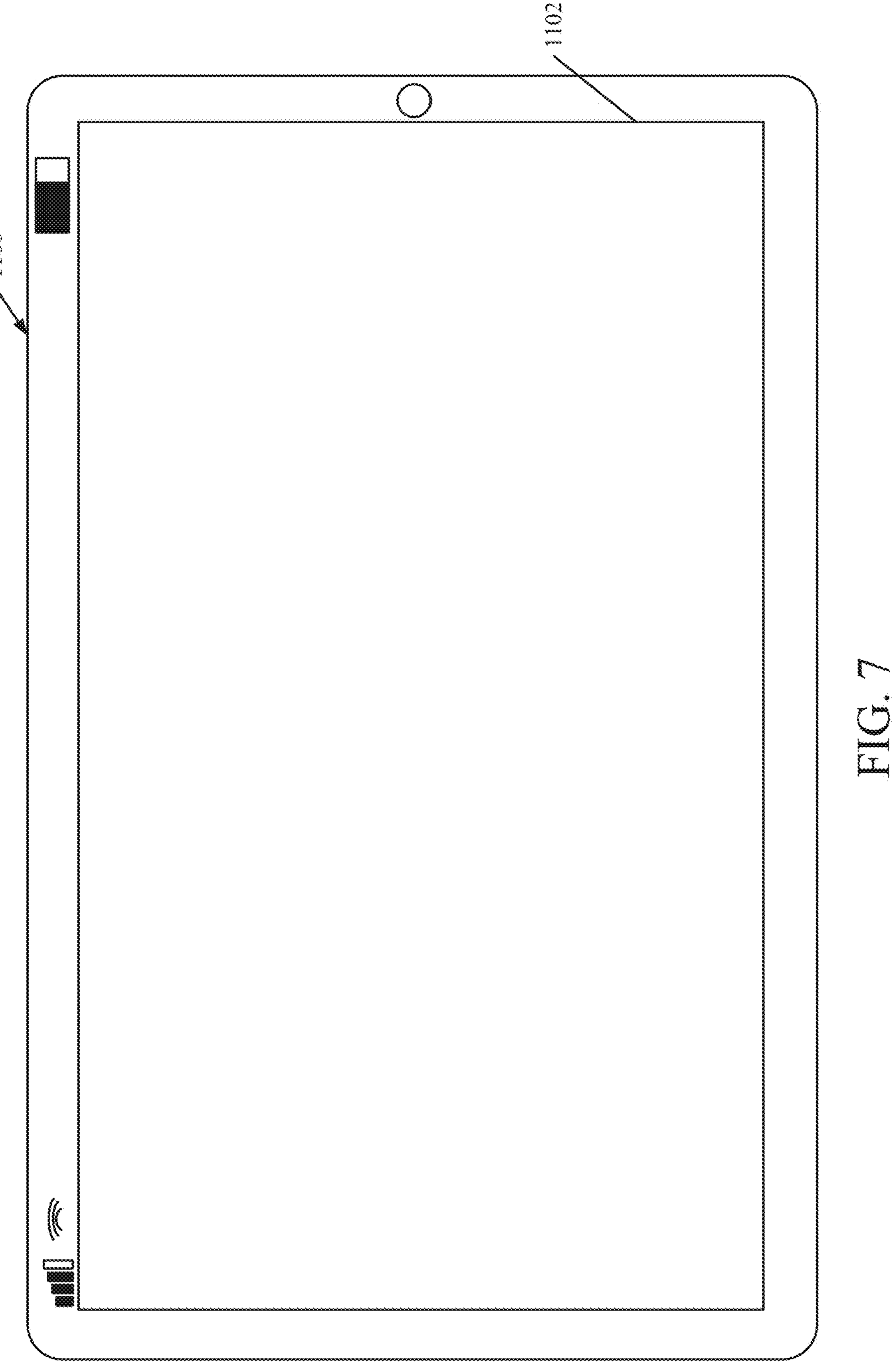
Figure 8:
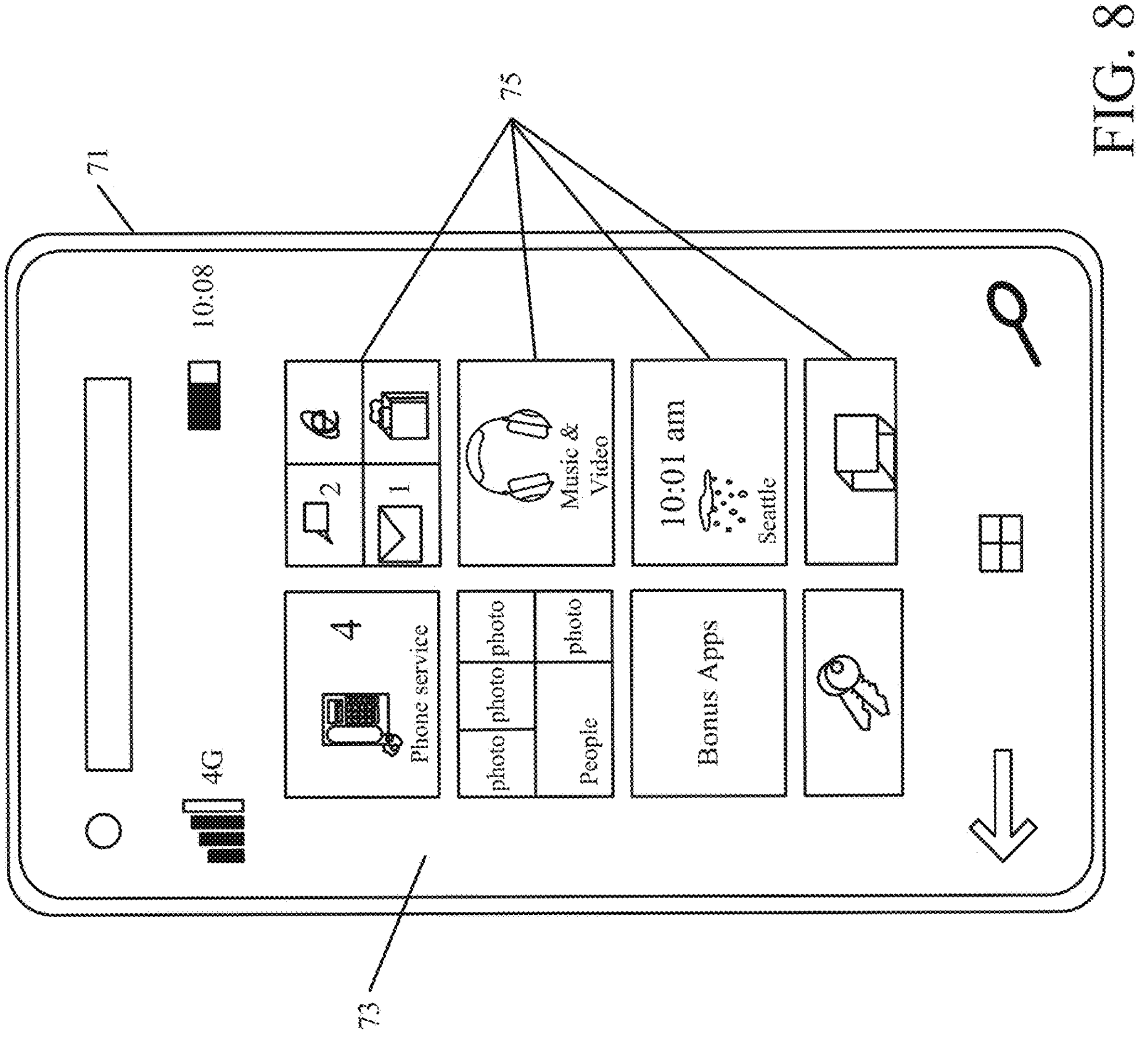

FIG. 6 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., a mobile work machine 104) for use in interacting with query execution computing system 102 or for use in executing functionality of query execution computing system 102. In another example, a mobile device can be used as a user associated computing system 104 for use in interacting with query execution computing system 102 or for use in executing functionality of query executing computing system 102. FIGS. 7-8 are examples of handheld or mobile devices.

FIG. 6 provides a general block diagram of the components of a client device 16 that can run some components shown in previous figures, that interact with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, client system 24, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 7 shows one example in which device 16 is a tablet computer 1100. In FIG. 7, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 8 is similar to FIG. 16 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
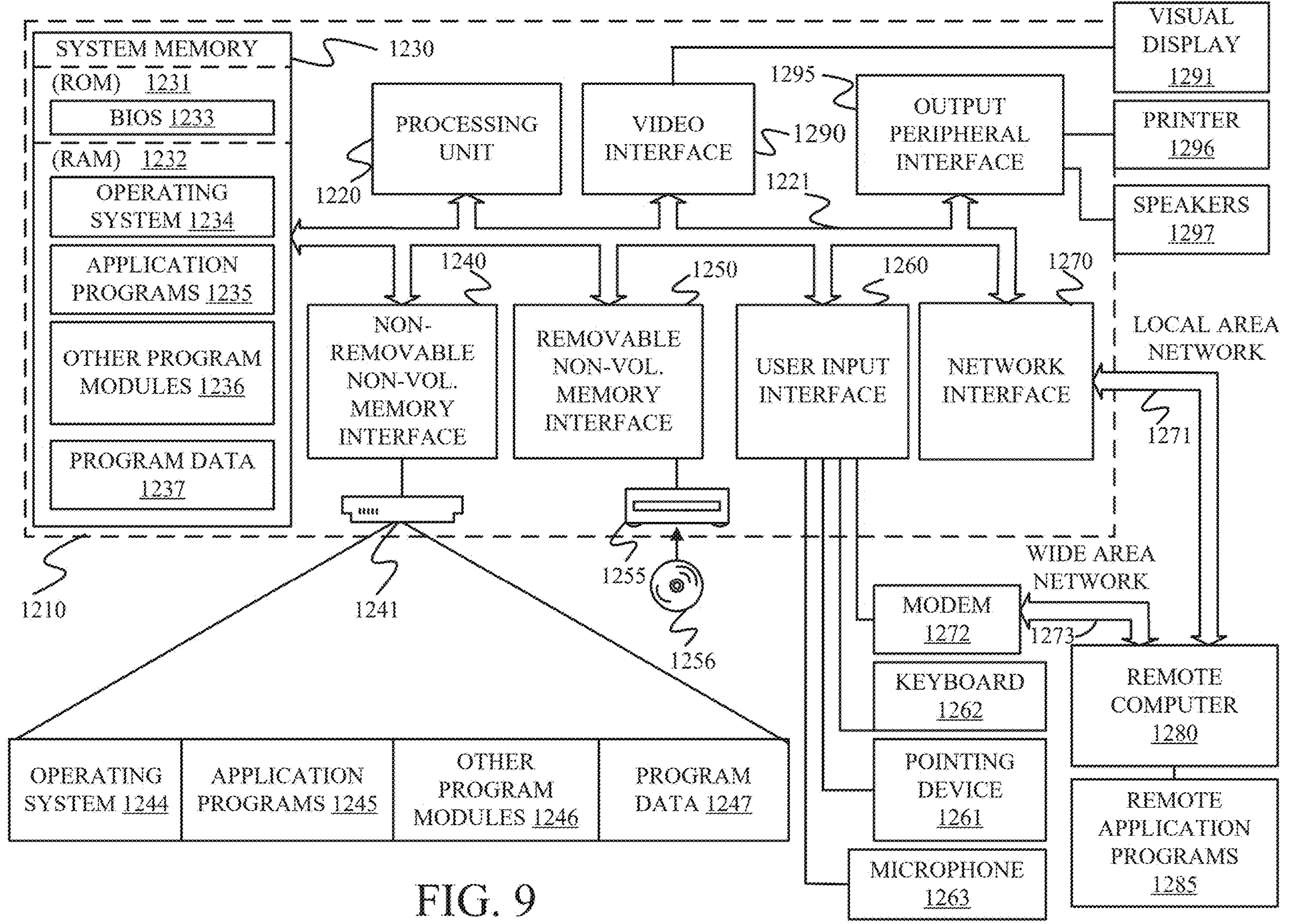
FIG. 9 is a block diagram showing one example of a computing environment that can be used in an agricultural computing system architecture.

FIG. 9 is one example of a computing environment in which elements of previous figures described herein can be deployed. With reference to FIG. 9, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 9.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage r other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 9 illustrates operating system 1234, application programs 1235, other program modules 1236, and program data 1237.

The computer 1210 may also include other removable/non-removable volatile/nonvolatile computer storage media. By way of example only, FIG. 9 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 9, provide storage of computer readable instructions, data structures, program modules and other data for the computer 1210. In FIG. 9, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network-CAN, local area network-LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 9 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A computer implemented method of controlling a user associated system, the computer implemented method comprising:

obtaining a query from a querying source;

obtaining querying source context data;

processing the query to identify an interrogative type corresponding to the query based on language in the query;

generating, based on the identified interrogative type, a prompt, the prompt identifying a task for an analytics engine;

providing the prompt to the analytics engine;

executing, with one or more models, analytics on one or more items of the querying source context data, based on the prompt;

determining one or more features of an output to be generated based on the identified interrogative type, the output responsive to the query;

generating the output based on the executed analytics and the determined one or more features; and controlling the user associated system based on the output.

2. The computer implemented method of claim 1, wherein controlling the user associated system based on the output comprises controlling a user interface mechanism of the user associated system to display a user interface based on the output, the user interface comprising one or more display elements corresponding to the one or more features and displaying information based on the executed analytics.

3. The computer implemented method of claim 1, wherein controlling the user associated system based on the output comprises controlling a controllable subsystem of a work machine, as the user associated system, based on the output.

4. The computer implemented method of claim 1, wherein processing the query to identify the interrogative type corresponding to the query based on language in the query comprises processing the query to identify, as the interrogative type, one of a descriptive interrogative type, a correlation interrogative type, a causation interrogative type, an intervention interrogative type, or a counterfactual interrogative type, based on language in the query.

5. The computer implemented method of claim 1 and further comprising:

processing the query to identify one or more variables corresponding to the query based on language in the query; and identifying the task for the analytics engine based on the identified interrogative type and the identified one or more variables.

6. The computer implemented method of claim 1, wherein executing, with one or more models, analytics on one or more items of the querying source context data, based on the prompt comprises generating one or more models using the one or more items of the querying source context data based on the prompt.

7. The computer implemented method of claim 1, wherein executing, with one or more models, analytics on one or more items of the querying source context data, based on the prompt comprises executing one or more preprocessed models using the one or more items of the querying source context data based on the prompt.

8. The computer implemented method of claim 1 and further comprising:

obtaining other source context data, wherein executing, with one or more models, analytics on one or more items of the querying source context data, based on the prompt comprises executing, with one or more models, analytics on one or more items of the querying source context data and one or more items of the other source context data, based on the prompt.

9. The computer implemented method of claim 1 and further comprising:

identifying a timing indicator based on the querying source context data; and determining as one of the one or more features, a recommended machine setting feature or a recommended prescription feature, based on the timing indicator.

10. An off-road operations computing system comprising:

a query execution computing system configured to obtain a query and to obtain querying source context data, the query execution computing system comprising:

a query processing system configured to process the query to identify an interrogative type corresponding to the query based on language in the query and to generate, based on the identified interrogative type, a prompt, the prompt identifying a task; and an analytics engine configured to obtain the prompt and to execute, with one or more models, analytics on one or more items of the querying source context data, based on the prompt, to determine one or more features of an output to be generated based on the identified interrogative type, the output responsive to the query, and to generate the output based on the executed analytics and the determined one or more features; and a controller configured to control a user associated system based on the output.

11. The off-road operations computing system of the claim 10, wherein the controller comprises a user interface controller configured to generate the control signal to control a user interface mechanism of the user associated system to generate a presentation based on the output, the presentation comprising one or more features corresponding to the one or more features and presenting information based on the executed analytics.

12. The off-road operations computing system of claim 10, wherein the user associated system comprises a mobile work machine, wherein the controller comprises a controllable subsystem controller configured to generate the control signal to control an actuator of the mobile work machine based on the output.

13. The off-road operations computing system of claim 10, wherein the query processing system is configured to identify, as the interrogative type corresponding to the query, one of a descriptive interrogative type, a correlation interrogative type, a causation interrogative type, an intervention interrogative type, or a counterfactual interrogative type, based on the language in the query.

14. The off-road operations computing system of claim 10, wherein the query processing system is further configured to process the query to identify one or more variables corresponding to the query based on language in the query and to identify the task based on the identified interrogative type and the identified one or more variables.

15. The off-road operations computing system of claim 10, wherein the querying source context data includes current querying source worksite data and historical querying source worksite data.

16. The off-road operations computing system of claim 15, wherein the query execution computing system is further configured to obtain other source context data and wherein the analytics engine is configured to execute with the one or more models, analytics on one or more items of the querying source context data and on one or more items of the other source context data, based on the prompt.

17. The off-road operations computing system of claim 16, wherein the other source context data includes worksite data corresponding to one or more other sources.

18. The off-road operations computing system of claim 10, wherein the analytics engine is further configured to identify a timing indicator based on the querying source context data; and determine as one of the one or more features, a recommended machine setting feature or a recommend prescription feature, based on the timing indicator.

19. An off-road operations computing system comprising:

one or more processors;

memory;

computer executable instructions stored in the memory, the computer executable instructions, when executed by the one or more processors, configuring the one or more processors to:

process a query to identify an interrogative type corresponding to the query and to identify one or more variables corresponding to the query, based on language in the query;

identify a task for performing analytics based on the identified interrogative type and the identified one or more variables;

generate, based on the task, a prompt, the prompt identifying the task;

determine one or more features of an output to be generated based on the identified interrogative type and querying source context data;

execute, with one or more models, analytics on one or more items of querying source context data, based on the prompt and based on the one or more features of the output to be generated;

generate the output based on the executed analytics and the determined one or more features; and a controller configured to control a user associated system based on the output.

20. The off-road operations computing system of claim 19, wherein the controller is configured to generate the control signal to control one of:

a user interface mechanism of the user associated system based on the output; or a controllable subsystem of the user associated system based on the output.

* * * * *